United States Patent
Melzian

[15] 3,648,389
[45] Mar. 14, 1972

[54] SYNTHETIC THORAX

[72] Inventor: Aldon L. Melzian, Arcadia, Calif.

[73] Assignee: Sierra Engineering Co., Sierra Madre, Calif.

[22] Filed: Nov. 24, 1969

[21] Appl. No.: 879,252

[52] U.S. Cl. ............................................................35/17
[51] Int. Cl. ......................................................G09b 23/30
[58] Field of Search ............................73/12; 223/66; 35/17

[56] References Cited

UNITED STATES PATENTS

| | | | |
|---|---|---|---|
| 2,995,833 | 8/1961 | Bezark | 35/17 |
| 3,273,261 | 9/1966 | Lovercheck | 35/17 |

*Primary Examiner*—Harland S. Skogquist
*Attorney*—Beehler & Arant

[57] ABSTRACT

A Synthetic Thorax for use with test dummies to simulate human bodily reactions under impact conditions. The Synthetic Thorax is made of high density polyethylene having dimensions similar to a human thorax and is 0.30 inch thick.

5 Claims, 6 Drawing Figures

PATENTED MAR 14 1972 3,648,389

INVENTOR.
ALDON L. MELZIAN
BY
Beehler & Arant
ATTORNEYS

SYNTHETIC THORAX

BACKGROUND OF THE INVENTION

1. Field of the Invention

The present invention relates to a synthetic human structure and more particularly to a synthetic thorax. The thorax is that region of a human being situated below the neck and above the abdomen.

2. Description of the Prior Art

Test dummies simulating human beings are used in an environment and under conditions where the risk of injury to a human being is high. Test dummies are also used where it is desirous to learn the magnitude of forces to which human beings might be subjected under certain situations; for example, it is often desirable to measure impact loads and damages that are sustained when a test dummy is subjected to "crash conditions" such as prearranged automobile accidents and ejections from high performance aircraft. Test data accumulated from the instruments associated with a test dummies are used in the structural design to which human beings are subjected in order to increase safety and eliminate or reduce injury in the event of an accident.

There are many factors which emphasize the use of test dummies as the ideal device for gathering data:

repeatability, ease of repair, ease of storage when not in use, and adaptability to instrumentation.

Of course, the value of a test dummy as a simulator is a direct function of the dummy's bodily identity to a human being. In this regard, it is desirable to have the test dummy assume human attributes, such as height, weight, body motion, and similarity of body responses to the test being performed. With regard to the latter requirement, test standards for the evaluation of impact behavior have been developed which require a test dummy to have a thorax having a spring rate closely similar to that of a human being. As mentioned, the thorax is that part of the body located beneath the neck and above the abdomen and is usually defined as the cavity in which the heart and lungs are located. By the term "spring rate" it is meant the load applied per unit deflection and is usually expressed as pounds per inch.

Various problems that have existed in the prior art include developing a thorax having an acceptable spring rate within a preselected deflection range, making a thorax with a shape having outer dimensions similar to an "average" human thorax, having a durable skin-like outer surface and being manufacturable in a relatively economical fashion.

SUMMARY OF THE INVENTION

The present invention solves the above-mentioned problems of the prior art by providing in a particular embodiment a synthetic thorax comprising a hollow enclosure of high density polyethylene having a thickness of 0.30 inch, a flatten oval cross section and a circumference, a major diameter and a minor diameter at the largest cross section of 30.60, 10.15 and 7.55 inches respectively.

An object of the present invention is to provide a synthetic thorax which closely simulates a human thorax in size, shape and spring rate, and which is relatively simple to construct and relatively inexpensive.

DESCRIPTION OF THE EMBODIMENT

Figure 1:
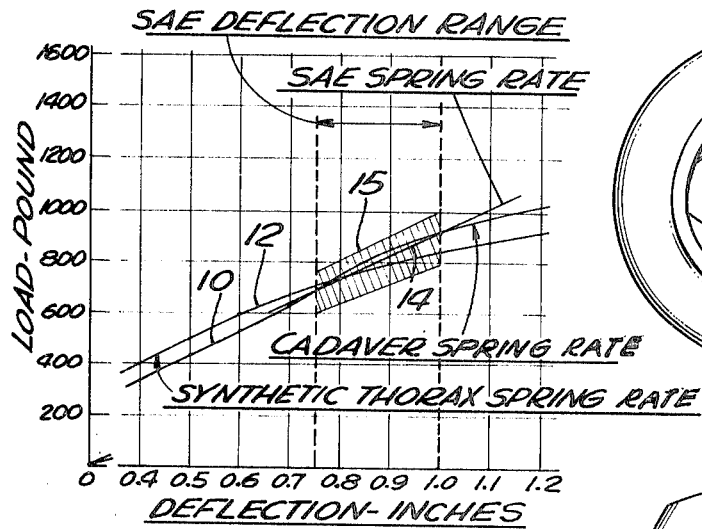
FIG. 1 is a graph of the spring rates for a human chest, for the synthetic thorax and to meet SAE requirements.
Figure 3:
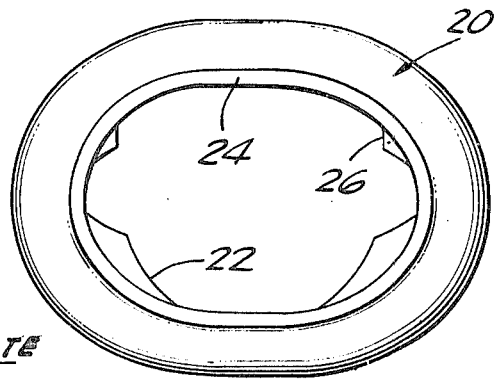
FIG. 3 is a top view of the synthetic thorax.

Referring to the drawing, FIG. 1 is a graph where load in pounds is marked along the ordinate and deflection in inches is marked along the abscissa in order to allow the plotting of spring rate curves. Compared are a spring rate curve 10 of a human cadaver, and a spring rate curve 12 of the synthetic thorax.

The curve 10 was obtained by placing the cadaver in a seated position and then impacting the cadaver with a 6-inch diameter target. Careful measurement of the applied load and deflection were taken during the impact. A similar impact test could be accomplished with a synthetic thorax as part of a test dummy or the thorax may be impacted by using a drop tower testing device. To achieve uniformity, the Society of Automotive Engineers (SAE) has developed a testing procedure and a standard spring rate for a synthetic thorax which is to be used for experimental purposes. Based upon the impact tests with the cadaver, the SAE determined that the spring rate should ideally be 900 pounds per inch in the deflection range of 0.75 to 1.00 inch. Curve 14 represents this spring rate. However, for testing purposes a spring rate within an area 15 defined by the four points 600 pounds, 0.75 inch; 750 pounds, 0.75 inch; 1,000 pounds, 1.00 inch and 800 pounds, 1.00 inch and straight lines connecting these points will suffice. It is noted that the deflection range 0.75 to 1.00 inch includes the first major yield or inflection point of the tested cadaver.

If a drop tower is used to determine the spring rate of a synthetic thorax, the drop tower must have the same alignment criteria as used for the impact test with the cadaver. The synthetic thorax drop tower assembly and mounting fixture weight is 22 ± 5 pounds and impact velocity is 22 ± 7 feet per second. Deflection measurement is made by measuring the sternum movement relative the spine, that is, the relative movement between the front and back surfaces of the synthetic thorax.

Figure 2:
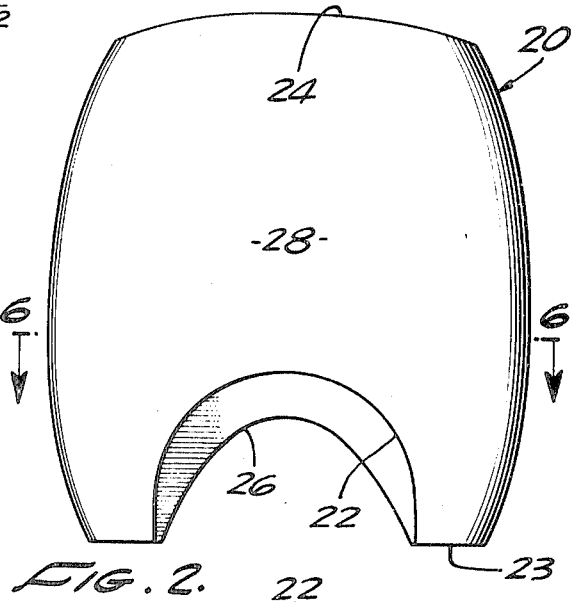
FIG. 2 is a front view of the synthetic thorax.

Referring now to FIGS. 2, 3, 4, and 5, there is illustrated in some detail the synthetic thorax 20. As seen in FIG. 2, the thorax 20 has a shape similar to that of a human thorax and includes a generally semicircular cutout 22 along the lower edge 23 of the thorax. The cutout 22 is roughly equivalent to the outline of the lower part of a human rib cage. The upper edge 24 of the thorax 20 has a gentle curve, as viewed in FIG. 5, in order to accommodate shoulder structure (not shown) when used as a part of a completed dummy. A second cutout 26 is made in the lower portion of the thorax oppositely disposed from the cutout 22. A material which has been found suitable to achieve the proper spring rate and to allow relatively easy manufacture is high density polyethylene, a synthetic thermoplastic resin. Such a resin is sold by the DuPont Company of Wilmington Del., under the designation of PE6023. The material may be conveniently formed into the thorax 20 by a rotary molding technique which is well known to those skilled in the art.

Figure 4:
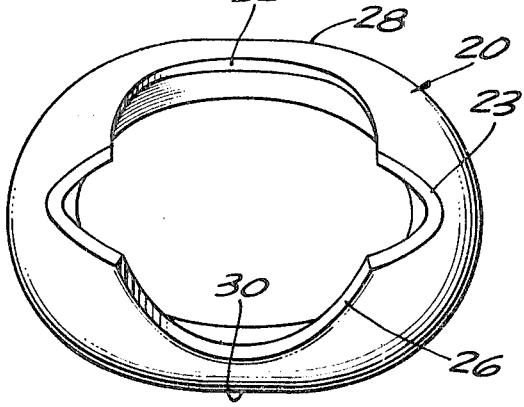
FIG. 4 is a bottom view of the synthetic thorax.

The molding technique produces a shape somewhat similar to a football where oppositely disposed lateral portions designated 28 and 30, FIG. 4, are flattened. The cutouts 22 and 26 are formed during the molding process, while the edges 23 and 24 are formed after the molding process. A thickness for the thorax of 0.30 inch has been found very suitable when combined with the remaining structure to closely simulate the spring rate of a human thorax.

Figure 6:
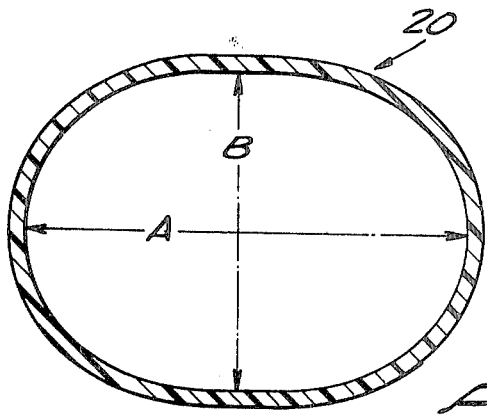
FIG. 6 is a plan cross section view taken along line 6—6 of FIG. 2.

Referring now to FIG. 6, there is illustrated an example of the largest cross-sectional area of the embodiment of the synthetic thorax having the material and thickness mentioned above. The general shape is that of an oval, having a major axis designated "A" of about 10.15 inches while the minor axis "B" is approximately 7.55 inches. The circumference measures 30.60 inches.

Figure 5:
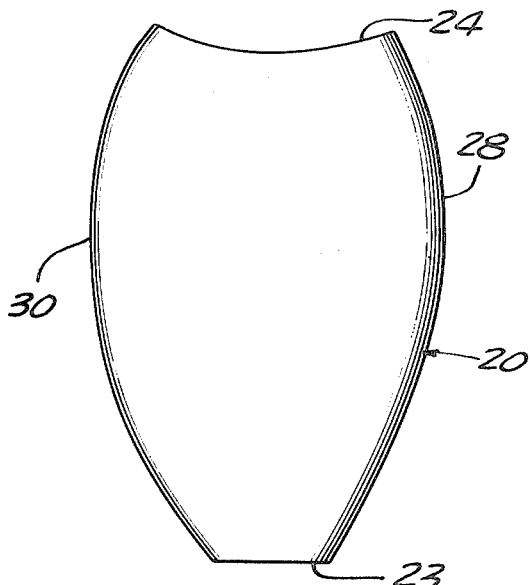
FIG. 5 is a side view of the synthetic thorax.

The overall height of the thorax, as would be viewed in FIG. 2 and measured along the curved surface, is approximately 12 inches while the cutout 22 has a diameter of approximately 6 inches, and the cutout 26 has a diameter of approximately 4 inches. The distance from the upper most point in the cutout 26 to the edge 24 measured along the curved surface, as best seen in FIG. 5, is about 9.625 inches, while the distance from the cutout 22 to the edge 24 is about 8.25 inches. In FIG. 2, the horizontal distance across the edge 24 is about 7.40 inches while horizontally across the edge 24, FIG. 5, the distance is 5.70 inches. The distance along edge 23 as viewed in FIG. 2 from the cutout 26 to the side curved lines is about 1.75 inches while from cutout 22 to the side curved lines is about 1.40 inches.

The thorax 20 may be used as shown or may be combined in a fully formed test dummy provided with various other synthetic parts. Additionally, the thorax 20 is hollow so as to have the capacity to accept a synthetic rib structure, backbone structure and any other internal elements necessary.

What is claimed is:

1. A synthetic thorax comprising a hollow enclosure of high density synthetic plastic resin material having a spring rate closely approximating that of a human thorax, said enclosure comprising oppositely disposed front and rear lateral portions which are of substantially uniform thickness and joined together at side portions thereof forming a generally elliptical exterior and interior configuration, said configuration having upper and lower ends tapering inwardly on all sides, the lower end having a cutout on both the front and rear lateral portion extending upwardly from the lower extremity, one of said cutouts being wider and deeper then the other cutout, both upper and lower ends of said enclosure being open at upper and lower end edges thereof.

2. A synthetic thorax as in claim 1 wherein the upper end edge is convexly upwardly curved at the front and rear and concavely curved at the sides.

3. A synthetic thorax as in claim 1 wherein the thickness is substantially about 0.30 inch.

4. A synthetic thorax as in claim 1 wherein all portions of the enclosure are compoundly curved throughout the entire exterior surface area.

5. A synthetic thorax as in claim 1 wherein the spring rate of the material comprising the enclosure is substantially uniform throughout all portions thereof.

* * * * *